July 4, 1944.        V. T. MOORE        2,352,908
DYNAMIC DAMPER
Filed Oct. 10, 1941
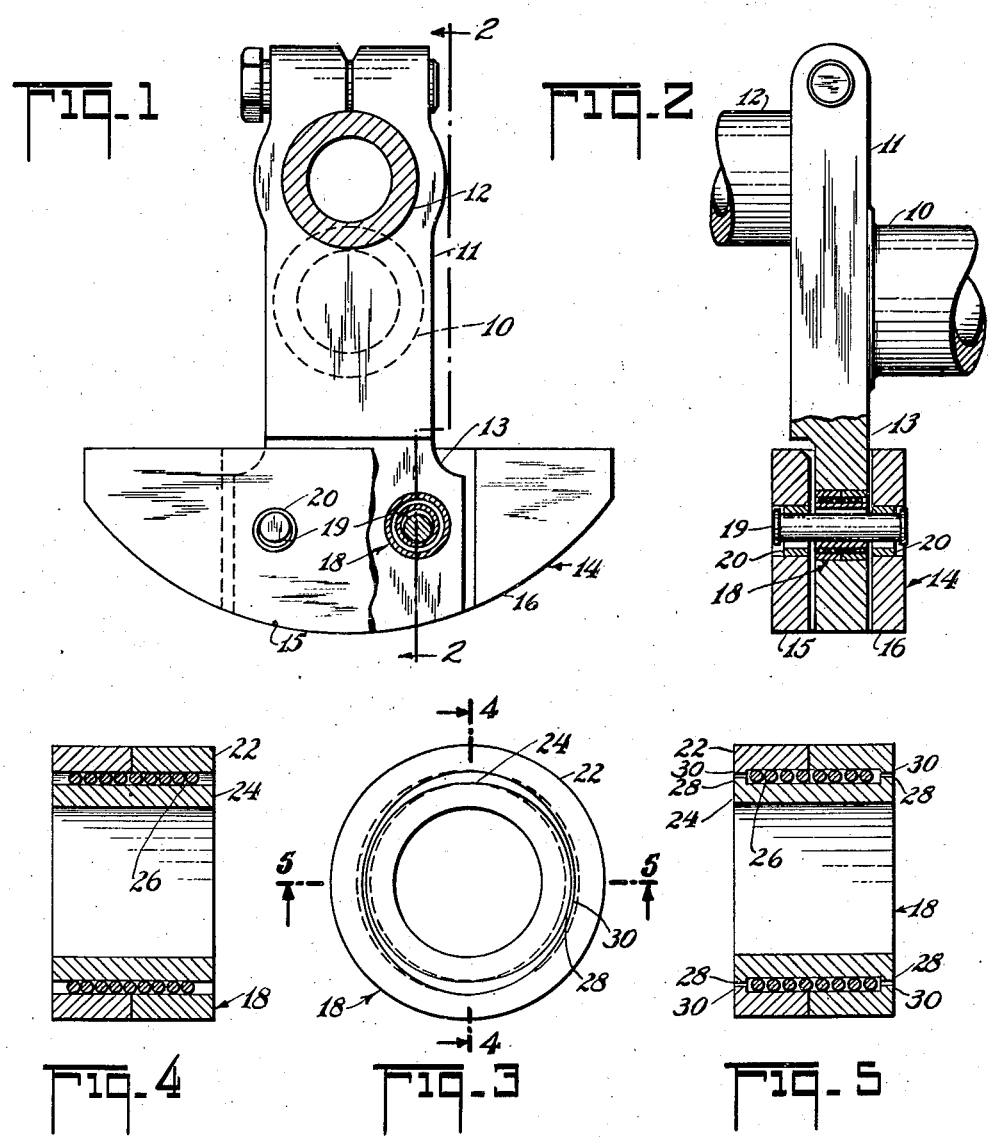
INVENTOR
VINCENT T. MOORE.
BY
ATTORNEY Patented July 4, 1944

2,352,908

UNITED STATES PATENT OFFICE 2,352,908

DYNAMIC DAMPER

Vincent T. Moore, Glen Rock, N. J., assignor to Wright Aeronautical Corporation, a corporation of New York Application October 10, 1941, Serial No. 414,447

5 Claims. (Cl. 308—26)

This invention relates to torsional vibration balancing means for engines, and in particular provides improvements over the structure shown in my Patent No. 2,239,111, issued April 22, 1941. The invention relates to tuned pendulum torsion balancers of the type shown in Chilton Patent No. 2,112,984, issued April 5, 1938.

The pendulum counterweight, known generally as a "dynamic damper" according to the Chilton teaching, has gone into widespread use, and has been eminently successful. However, in a few installations certain vibrations of the crankshaft system are encountered which cause galling or scuffing of the tracks and rollers which serve as the support for the pendulum counterweight upon the crankshaft extension. This invention has for an object a provision of an axially yieldable connection between the crankshaft extension and the counterweight system whereby the extension is free to vibrate in an axial direction without transmitting this vibration to the counterweight system or to the support elements forming a part thereof.

A further object of the invention is to provide a bushing assembly having inner and outer parts which are axially yieldable relative to one another but which have a high degree of radial stiffness.

A further object is to incorporate an axially yieldable connection, having great radial stiffness, in a supporting system in a machine or more specifically, in a torsional pendulum organization.

A further object includes the provision of detailed structure by which inner and outer bushing elements are axially yieldable but radially rigid, wherein the degree of yield is small and wherein the bushing parts are in the main retained in a determinate axial position with respect to one another.

The provisions of the invention will be better understood by a reading of the annexed detailed description with the drawing, in which:

Fig. 1 is an end elevation partly in section and partly broken away, of a crankshaft assembly including a torsional counterweight incorporating the invention;

Fig. 2 is a side elevation of a crankshaft, partly in section, on the line 2—2 of Fig. 1;

Fig. 3 is an end elevation of the bushing shown in Figure 4; and

Figs. 4 and 5 are sections on the lines 4—4 and 5—5 of Fig. 3, respectively.

In accordance with the general teachings of Patent No. 2,112,984, the structure shown includes a crankshaft journal 10 having an integral crankcheek 11 clamped to a crankpin 12 in the conventional manner, the crankcheek being extended as at 13 to comprise a support for a movable counterweight mass 14 which comprises counterweight halves 15 and 16 embracing the extension 13 in clearance relation thereto and secured together by bolts. The extension 13 is provided with spaced bores whose axes are parallel to the shaft axis and into each of which is fitted a bushing assembly designated in its entirety as 18, the bore of each assembly 18 comprising an arcuate track rollably supporting a pin 19 which, in turn, rollably engages bushings 20 fitted to the counterweight halves 15 and 16. The bores in the bushings 18 and 20 are of larger diameter than the pin 19 so that, when two pins are used, the counterweight 14 is freely movable as a simple pendulum whose length is determined by the diameters by the said bores and pins.

Now, as indicated in the above objectives, the extension 13 is susceptible to vibration in a direction parallel to the crankshaft axis which, if it be transmitted through the counterweight supporting assembly, causes axial sliding of the pins 19 upon their tracks with resultant wear and scuffing, since this movement is different from the true rolling contact in the plane of rotation, and the wear due to rolling contact is negligible. To allow the extension 13 to vibrate in the above manner without affecting the rolling contacts or the counterweight, I provide an axially yieldable arrangement incorporated in the bushing assembly 18, which is best shown in Figs. 3, 4, and 5. The assembly 18 comprises an outer bushing pair 22 which is fitted to the bore of the extension 13, and an inner bushing 24 in radially spaced relation to the bushing 22, the bore of the bushing 24 providing the rolling track for the pin 19. In the annular space between the two bushings, a plurality of round wire rings 26 are stacked. These rings may split, or alternately may comprise a continuous helical coil. The individual rings or turns of the coil provide in effect a roller bearing between the bushings 22 and 24, and upon relative axial movement of the bushings, the wire rolls to provide continuous rolling contact therebetween. The wire, of course, rolls upon a curved axis so that the inner and outer fibres thereof are strained affording a restitutional force to return the two bushings to their normal coplanar attitude.

To allow free rolling of the wire upon the bushings without restraint other than that offered by the wire itself, the top and bottom surfaces of the bushings 22 and 24, as shown in Figs. 3 and 4, are cylindrical. However, the lateral portions of the bushing are provided with segmental end flanges 28 and 30 on bushings 24 and 22 respectively between which the coils 26 are confined to prevent bodily axial displacement of the bushings and coils. That is, the top and bottom portions of the flanges 28 and 30 are relieved or cut away. The wire, under vibratory action of the counterweight assembly, may bend and roll between the bushings but, should the tendency toward axial displacement become excessive, the flanges 28 and 30 will prevent excessive axial displacement of the wire at the relieved sections of the flanges, and portions of the coils may slide rather than roll upon the bushing surfaces. Obviously it is only essential that the flanges 28 and 30 be relieved at the loaded or bottom side of the bushing. This construction of the flanges 28 and 30 prevents excessive bodily axial displacement of the bushings and wire without interfering with the rolling action of the wire itself.

For assembly purposes, the bushing 22 is shown in two parts. The coils 26 are first assembled on the bushing 24 and the halves 26 are then slipped over the ends of the coil. The whole assembly 18 is then closely fitted to the bore in the extension 13.

This form of axially yieldable joint is radially rigid and eliminates sliding engagements for the axial yield with consequent reduction in wear and frictional restraint to free axial movement.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An axially deformable radially rigid bushing assembly adapted to surround a shaft-like member and comprising outer and inner annular members radially spaced to define therebetween an annular space, and means disposed between said members within said annular space to permit relative axial movement of said members, said means comprising a coil of round wire, the outer and inner surfaces of the coil turns bearing respectively on the surfaces of the outer and inner annular members.

2. An axially yieldable bushing assembly adapted for bearing engagement with a shaft-like member extending therethrough and comprising inner and outer bushing members having cylindrical tracks radially spaced apart, said members being arranged for relative axial movement, and an axially curved roller between said members and engaging said tracks, said roller comprising a rigid connection between said members for transmitting radial loads, but being rollable on its curved axis upon relative axial displacement of the members.

3. An axially yieldable bushing assembly comprising inner and outer bushing members having cylindrical tracks radially spaced apart, an axially curved roller between said members and engaging said tracks, said roller comprising a rigid connection between said members for transmitting radial loads, but being rollable on its curved axis upon axial displacement of the members, and means to constrain said members against axial separation comprising flanges at each end of each member between which said roller is confined, said flanges being relieved at the loaded side of the bushing.

4. An axially yieldable bushing assembly comprising inner and outer radially spaced annular bushing members, a stack of ring elements disposed in said space each having a circular cross section, and flange means extending at least partially across the ends of said radial space and between which said ring elements are confined, said flange means being relieved at the loaded side of the bushing.

5. An axially yieldable bushing assembly adapted for fitting engagement within a member and adapted for bearing engagement with a shaft-like member, said assembly comprising an inner annular bushing member radially spaced from said member, and an axially curved roller between said members; said roller comprising a rigid connection between said members for transmitting radial loads, but being rollable on its curved axis upon relative axial displacement of said members.

VINCENT T. MOORE.